Patented June 23, 1953

2,643,193

UNITED STATES PATENT OFFICE 2,643,193

INSULATING FILLER COMPOSITION

Louis Weber, Sr., Tacoma, Wash., assignor to Weber Insulations, Incorporated, East Chicago, Ind., a corporation of Indiana No Drawing. Application October 6, 1948, Serial No. 53,153

2 Claims. (Cl. 106—98)

The present invention relates to a new and improved prepared insulating filler composition which is adapted to be used as a so-called "aggregate," in place of sand, for mixture with hard wall plaster or cement and water to produce a hard wall plaster coating.

Various objects of the invention reside in the provision of a prepared insulating filler composition which will not deteriorate or break down in the presence of moisture but can be stored indefinitely in stock for use as required, which has a very large water absorption capacity so that it will absorb and hold a quantity of water greatly in excess of that required for chemical reaction with the plaster or cement, which has good heat insulating properties, and which is comparatively low in cost and may be used with ease and convenience.

Other objects are to provide an insulating filler composition of the foregoing character which, when mixed in suitable proportions with hard wall plaster or cement, will produce, ready for application, a wet plaster coating composition having greatly improved slipping properties under the action of the trowel, and having an extensive spread capacity so as to cover a large surface area with minimum cost.

Still further objects are to provide a prepared insulating filler composition which, when used as the aggregate with a hard wall plaster, will result in a finished plaster coat which is light in weight, which has good heat insulating and acoustical properties, which will not check or crack on thermal expansion or contraction, which substantially eliminates wall sweating, and which is fire and vermin proof.

Other objects and advantages will become apparent as the description proceeds.

A filler composition embodying the features of the present invention comprises blown mineral fiber, such as rock wool or slag wool, asbestos fiber, diatomaceous earth powder and a colloidal clay.

The mineral fiber and asbestos fiber are ground or otherwise broken down into suitable aggregate size. In the presence of water, these fiber particles separate so as to obtain a substantially homogeneous dispersion throughout the mass of the composition. The mineral and asbestos fibers are comparatively low in cost and light in weight. They have good heat insulating properties and a tremendous water absorption capacity. The asbestos fiber is somewhat heavier than the mineral fiber and will absorb slightly less water than the latter, but appreciably improves the slipping properties of the plaster coating upon applying the latter to the surface to be covered.

The diatomaceous earth powder serves as a filler to which the mineral and asbestos fibers may bond, and also serves to improve the slipping properties of the plaster coating. In addition, the diatomaceous earth powder is light in weight and low in cost.

The colloidal clay, which may be a bentonite clay, serves as a binder for the other ingredients.

The proportions of the foregoing ingredients may be varied within limits without departing from the broad concept of the present invention. I have found that, for various applications, good results are obtained by the use of a composition comprising the following ingredients in the following ranges of proportions by weight.

| Ingredients: | Parts |
|---|---|
| Mineral fiber | 100 |
| Asbestos | 3 to 7 |
| Diatomaceous earth powder | 5 to 20 |
| Colloidal clay | 5 to 15 |

In regard to the foregoing proportions, if more than 7 parts of asbestos fiber are employed, the weight of the composition is undesirably increased, and the water absorption capacity correspondingly reduced. If less than 3 parts of asbestos fiber are employed, the desired slipping properties sought by the use of the asbestos fiber are not realized.

If more than 20 parts of the diatomaceous earth powder are employed, the spreading properties of the plaster coating are objectionably reduced, and the finished plaster coat has a tendency to check. When used below 5 parts, the diatomaceous earth powder does not contribute the desired slipping properties nor supply the desired volume of filler.

If more than 15 parts of the colloidal clay binder are employed, the plaster coat will be subject to objectionable shrinkage and will suffer reduction in spread capacity. If less than 5 parts of the binder are employed, the slipping characteristics of the plaster coat will be impaired, and the desired bond will not be obtained.

In determining the most advantageous proportions, the objective should be to provide a composition which when used as the aggregate in a hard wall plaster coating, will result in a plaster with smooth slipping properties that is easy to apply, and will give maximum surface spread and heat insulation at the same time. The preferred composition comprises the following ingredients in substantially the following proportions by weight:

| Ingredients: | Parts |
|---|---|
| Coarsely ground mineral fiber | 100 |
| Coarsely ground asbestos fiber | 5 |
| Diatomaceous earth powder | 10 |
| Colloidal clay | 10 |

In use, any desired quantity of composition compounded according to the present invention is mixed with hard wall plaster or cement in the presence of a copious amount of water to produce a plaster mix. A satisfactory hard wall plaster coating is obtained by mixing 50 pounds of the composition with 100 pounds of hard wall plaster or 100 pounds of Portland cement, and 20 to 25 gallons of water. The density and consistency of the plaster mix can, of course, be controlled by varying the amount of water that is added. To increase the density, the amount of water is reduced. In any event, due to the high absorption capacity of the composition, the amount of water which is added can be and is greatly in excess of that required to cure the finished plaster coat. Because of this excess water, it is unnecessary to sprinkle or wet the surface of the plaster coat, as is commonly done with other types of plaster, to insure proper cure. After application of the plaster coat, the excess moisture not required for curing the plaster or cement will evaporate and thus leave throughout the mass a large number of miniature air cells which greatly enhance the heat insulating properties of the coat. Tests have shown that a plaster spread one-half inch in thickness will afford as much thermal insulation as four inches of conventional wall fill insulation.

Plaster coating made with the present composition is very light and has good slipping properties so that it will give an extensive spread to cover a maximum area. It affords a plaster coat and heat insulation in one application. The finished coat is tough and will not crack upon thermal expansion or contraction of the base surface to which it is applied.

Plaster made with the present composition is especially suited for interior wall surfacing because of its advantageous acoustical and heat insulating properties. For this purpose, the composition is usually mixed with hard wall plaster rather than with cement, and is commonly applied in from one to three coats as the scratch coat underneath a finish coat of hard wall plaster. However, if desired, the scratch coat itself may be trowelled to provide a smooth surface finish.

Plaster made with the present composition is also adapted for exterior use, as, for example, for roof decks and exterior stucco. For stucco applications, the composition is mixed with Portland cement rather than with hard wall plaster.

While the composition may be provided as the only aggregate for mixture with hard wall plaster or cement, it can be compounded with other aggregate materials such as pumice, pearlite or vermiculite.

It will be understood that in the following claims the term "cement," except as modified by adjectives, is used in its broader or generic sense and includes hard plaster as well as other cements such as Portland cement.

I claim as my invention:

1. A hardenable plastic wall coating consisting of the following ingredients in the following proportions by weight: Substantially two parts of a cementitious material selected from the group consisting of Portland cement and commercial hard plaster; substantially one part of an aggregate consisting of:

| | Parts |
|---|---|
| Mineral wool fiber | 100 |
| Asbestos fiber | 3 to 7 |
| Diatomaceous earth powder | 5 to 20 |
| Colloidal clay | 5 to 15 |

Water in excess of the quantity required to combine chemically with the cementitious material.

2. A mix capable upon the addition of water of forming a hardenable plastic wall coating, said mix consisting of a major proportion by weight of a cementitious material selected from the group consisting of Portland cement and commercial hard plaster and a substantial proportion of a composition forming an aggregate, consisting of the following ingredients in the following proportions by weight:

| | Parts |
|---|---|
| Mineral wool fiber | 100 |
| Asbestos fiber | 3 to 7 |
| Diatomaceous earth powder | 5 to 20 |
| Colloidal clay | 5 to 15 |

LOUIS WEBER, Sr.

References Cited in the file of this patent

UNITED STATES PATENTS

| Number | Name | Date |
|---|---|---|
| 803,285 | Hayde | Oct. 31, 1905 |
| 1,307,549 | Headson | June 24, 1919 |
| 1,314,772 | Viens | Sept. 2, 1919 |
| 1,920,358 | Clark | Aug. 1, 1933 |
| 1,968,489 | Jenkins | July 31, 1934 |
| 2,033,106 | Cummins | Mar. 3, 1936 |
| 2,063,102 | Jones | Dec. 8, 1936 |
| 2,275,816 | Ericson | Mar. 10, 1942 |
| 2,311,588 | Denning | Feb. 16, 1943 |

FOREIGN PATENTS

| Number | Country | Date |
|---|---|---|
| 497,136 | Great Britain | Dec. 13, 1938 |
| 587,556 | Great Britain | Apr. 29, 1947 |